United States Patent
Hadden et al.

(10) Patent No.: US 7,652,549 B2
(45) Date of Patent: Jan. 26, 2010

(54) BI-STABLE MAGNETIC LATCH WITH PERMANENT MAGNET STATOR

(75) Inventors: Steve L. Hadden, Peoria, AZ (US); Paul D. Buchele, Glendale, AZ (US); David Osterberg, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 104 days.

(21) Appl. No.: 11/782,399

(22) Filed: Jul. 24, 2007

(65) Prior Publication Data
US 2009/0027148 A1  Jan. 29, 2009

(51) Int. Cl.
H01F 7/08 (2006.01)
H01F 7/00 (2006.01)
H02K 33/00 (2006.01)
H02K 21/12 (2006.01)

(52) U.S. Cl. ............... 335/234; 335/229; 335/220; 310/36; 310/156.01

(58) Field of Classification Search ......... 335/229, 335/234, 272; 310/36, 156.01
See application file for complete search history.

(56) References Cited

U.S. PATENT DOCUMENTS

| | | | | |
|---|---|---|---|---|
| 3,631,366 A | * | 12/1971 | Ugon | 335/82 |
| 4,387,357 A | * | 6/1983 | Mandel et al. | 335/272 |
| 4,500,861 A | * | 2/1985 | Nelson | 335/253 |
| 4,864,264 A | * | 9/1989 | Gamble | 335/234 |
| 5,337,030 A | * | 8/1994 | Mohler | 310/156.37 |
| 5,699,031 A | * | 12/1997 | Covelli et al. | 335/272 |
| 6,507,257 B2 | * | 1/2003 | Mohler | 335/220 |
| 6,674,349 B1 | * | 1/2004 | Bolongeat et al. | 335/229 |
| 6,950,569 B2 | * | 9/2005 | Smith | 385/16 |
| 6,956,453 B2 | * | 10/2005 | Osterberg | 335/229 |
| 7,468,646 B2 | * | 12/2008 | Osterberg | 335/179 |
| 2005/0168309 A1 | * | 8/2005 | Engel | 335/229 |
| 2007/0279168 A1 | * | 12/2007 | Osterberg | 335/272 |

* cited by examiner

*Primary Examiner*—Elvin G Enad
*Assistant Examiner*—Alexander Talpalatskiy
(74) *Attorney, Agent, or Firm*—Ingrassia Fisher & Lorenz, P.C.

(57) ABSTRACT

A magnetic latch includes a stator having first and second permanent magnets disposed on either side of a center portion. Each of the first and second permanent magnets has at least two associated poles. A rotor has at least one magnetic region. The rotor is configured for rotation about an axis of the stator between a first latched position and a second latched position.

9 Claims, 4 Drawing Sheets

BI-STABLE MAGNETIC LATCH WITH PERMANENT MAGNET STATOR

STATEMENT REGARDING FEDERALLY SPONSORED RESEARCH OR DEVELOPMENT

This invention was made with Government support under Honeywell Project Number 4400140377 entitled "Element Selector Assembly," and awarded by the U.S. Department of Defense. The Government has certain rights in this invention.

TECHNICAL FIELD

The present invention generally relates to magnetic latches, and more particularly relates to a magnetic latch having a stator with an integrated permanent magnet.

BACKGROUND

Magnetic latch devices and stepper motor devices are commonly utilized in fast pivot mechanisms such as so-called "fast filter" devices. Fast filter devices, for example, provide for switching an optical element into and out of an optical path. The optical element may be moved by an arm assembly which is coupled to the magnetic latch device or stepper motor device.

Typically, permanent magnets have been located on the rotor element of such stepper motors or magnetic latch devices. Such an implementation can complicate the balance of the rotor element by having a large number of parts associated with the rotor which need to be secured.

Having permanent magnets located on the rotor element can limit the allowable cross sectional area of the permanent magnets. In addition, the inertia of the rotor element is increased with respect to the cross sectional area of the permanent magnets. Finally, shunting of the permanent magnets, while maintaining a precise degree of balance in the rotor element, can be problematic.

Accordingly, a need exists for an apparatus such as a magnetic latch device which addresses one or more of the above-noted drawbacks. In addition, it is desirable to implement such a device without excessive design complications, or expending excessive resources. Furthermore, other desirable features and characteristics of the present invention will become apparent from the subsequent detailed description of the invention and the appended claims, taken in conjunction with the accompanying drawings and this background of the invention.

BRIEF SUMMARY

An apparatus is provided for a magnetic latch. The apparatus comprises a stator having first and second permanent magnets disposed on either side of a center portion. Each of the first and second permanent magnets having at least two associated poles. A rotor has at least one magnetic region configured for rotation about an axis of the stator between a first latched position and a second latched position.

In another embodiment, an apparatus is provided for a bi-stable magnetic latch. The apparatus comprises a stator having an axis, first and second outer portions, a center portion, a first permanent magnet disposed between the first outer portion and the center portion, and a second permanent magnet disposed between the second outer portion and the center portion. A rotor has at least one magnetic region configured for attraction to the first and second permanent magnets. The rotor is configured for rotation about the axis between a first latched position and a second latched position. A dual magnetic circuit is thereby formed, including a first magnetic circuit incorporating the first permanent magnet, the first outer portion of the stator, the at least one magnetic region of the rotor, and the center portion of the stator, and a second magnetic circuit incorporating the second permanent magnet, the second outer portion of the stator, the at least one magnetic region of the rotor, and the center portion of the stator.

In still another embodiment, an apparatus is provided for a bi-stable magnetic latch assembly. A stator has an axis and integrates first and second permanent magnets between first and second outer portions. The first and second permanent magnets are angularly disposed about the axis. A rotor has first and second magnetic regions attracted to at least a portion of each of the first and second permanent magnets. The first and second magnetic regions and the first and second permanent magnets constitute dual, first and second magnetic circuits. A coil is associated with the stator for reducing the force of attraction between the first and second magnetic regions and the first and second permanent magnets.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

To address the drawbacks previously described, the permanent magnets in a magnetic latch device can be relocated from the rotor element to the stator element, forming a dual magnetic circuit. In one embodiment, this configuration allows for the use of a single-piece rotor, fabricated of unitary construction, in the magnetic latch device. In additional embodiments, rotor devices, and thereby, magnetic latch devices having lower part counts are obtained. Use of a single-piece rotor may result in a variety of benefits. The rotor element inertia may be lowered. A 360 degree precision speed balance of the rotor element may be obtained. Further, the magnetic latch device may produce increased torque output without a weight or power penalty. Finally, a more efficient magnetic circuit (or dual magnetic circuits) may be obtained, which can be adjusted by shunting the permanent magnets in the circuit.

Figure 1:
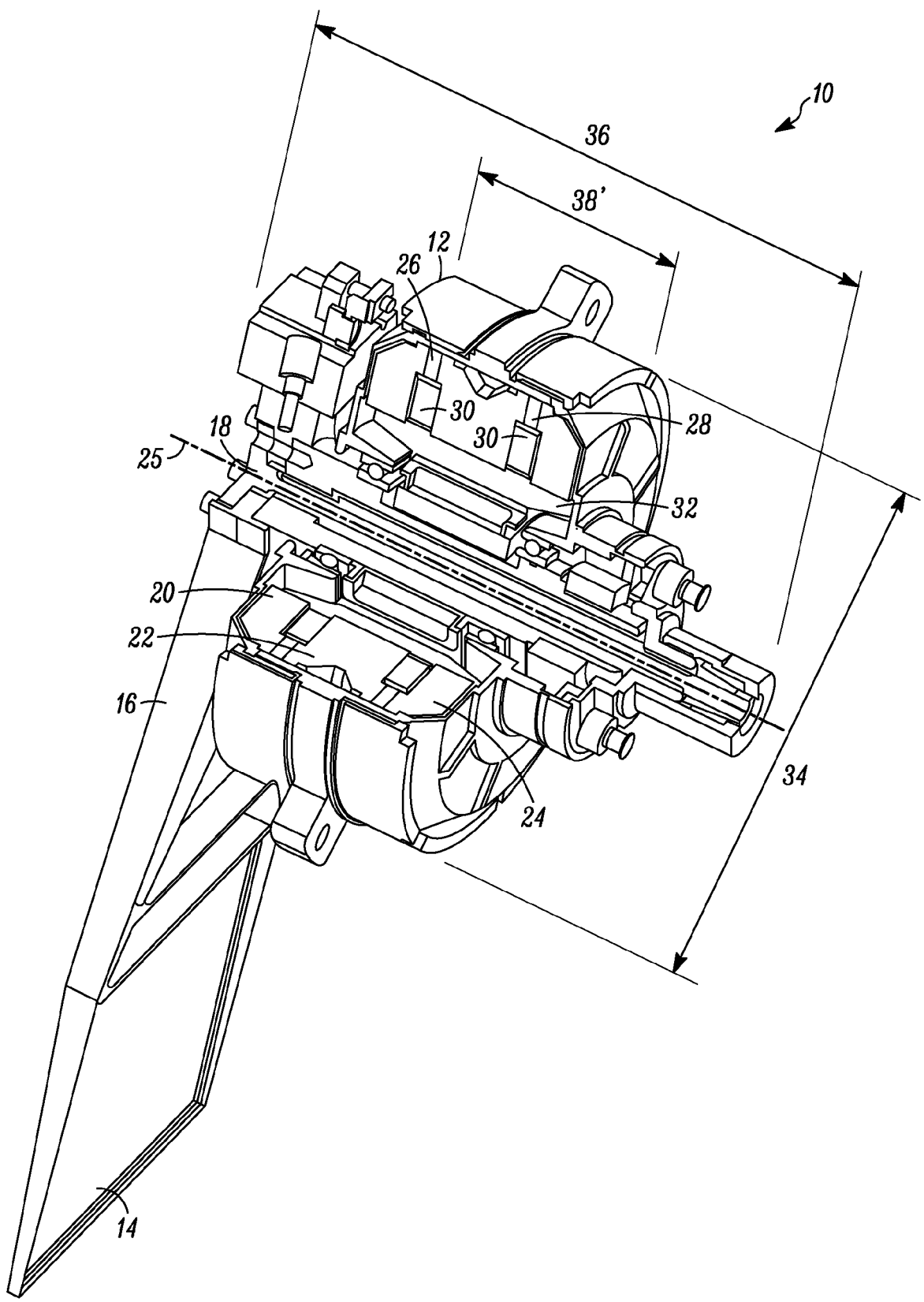
FIG. 1 illustrates a three dimensional, cutaway representation of a fast filter device incorporating an exemplary magnetic latch device.

FIG. 1 illustrates a three dimensional, cutaway representation of a fast filter device 10 incorporating an exemplary magnetic latch device 12. Fast filter device 10 includes a magnetic latch 12 as will be further described in additional detail. An optical filter 14 or a similar optical element is coupled to the latch 12 by an holder arm 16 and a rotor shaft assembly 18. Fast filter device 10 can be described as a fast pivot mechanism 10 utilized to latch the pivoted filter 14 in one of two latched positions.

The stator element of the latch 12 is divided into a first outer stator portion 20, a center portion 22, and a second outer stator portion 24. The stator portions 20, 22, and 24 are angularly disposed about an axis 25 as shown. As will be further described and illustrated, a first permanent magnet 26 is integrated into the stator element and angularly disposed about the axis 25 between the first outer stator portion 20 and the center stator portion 22. A second permanent magnet 28 is also integrated into the stator element and angularly disposed about the axis 25. Permanent magnet 28 is positioned between the center stator portion 22 and the second outer stator element 24. As would be anticipated, magnets 26 and 28 each have at least two associated poles (not shown) which correspond to portions of each of a dual magnetic circuit. In one embodiment, the magnetic flux associated with each of the dual magnetic circuits latches the rotor 32 in its first latched position.

A portion of a coil 30 is depicted adjacent to the permanent magnets 26 and 28. The coil can be energized with an electrical current of a polarity such that a flux is generated in the various magnetic elements of latch 12 to overcome the magnetic flux previously described, and thereby release the rotor 32 from the first latched position into a second latched position.

Rotor shaft assembly 18 may include any shaft which is affixed to the rotor 32 including a shaft that is capable of applying torsion to the rotor 32 when the rotor is in either of its latched positions, such as a torsion bar or a shaft biased by a torsion spring, for example. The rotor shaft need not be a shaft under torsion, however, as the repulsive effect associated with electrically charging the coil 30 begins the movement of the rotor from a first latched position to a second latched position.

In one embodiment, various example dimensions include a width 34 of the latch 12 of about 3.650 inches (in). A height 36 of the latch 12 and rotor arm assembly 18 is about 4.050 inches, and finally, a height of the latch 12 is about 1.700 inches. As will be appreciated, however, the exemplary dimensions may be varied to suit a particular application or implementation.

Figure 2A:
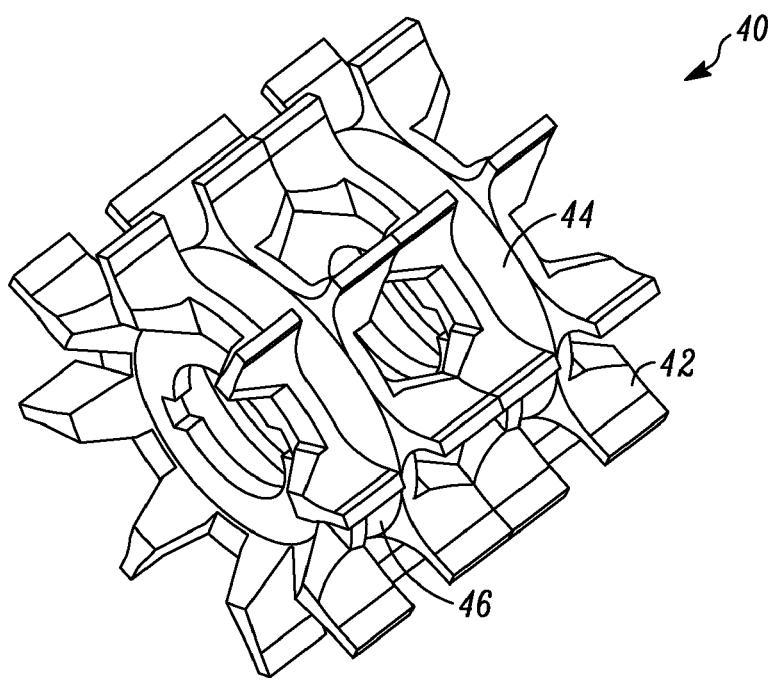
FIG. 2A illustrates an exemplary rotor element incorporating two permanent magnets.

FIG. 2A illustrates an exemplary rotor element configuration 40 of a rotor element 42. Permanent magnets 44 and 46 are angularly disposed on the rotor element 42 as depicted. The permanent magnets 44 and 46 add weight and thereby, inertia, to the rotor element 42. For example, in one embodiment, an exemplary weight of rotor element 42 is about 0.58 pounds (lbs), with a corresponding inertia of 0.0009 lbf-in-sec$^2$.

Figure 2B:
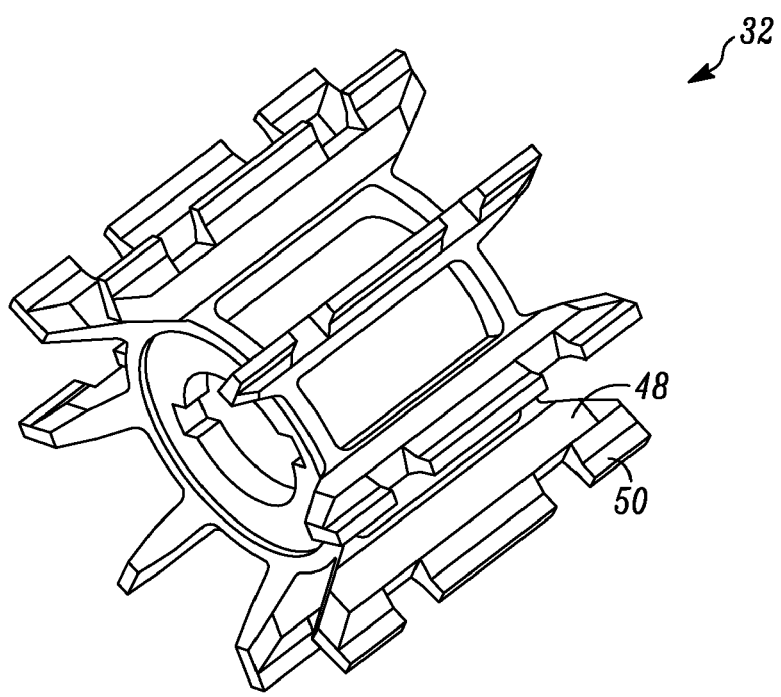
FIG. 2B illustrates an exemplary rotor element, according to the present invention, where the permanent magnets are not incorporated into the rotor.

FIG. 2B illustrates an exemplary rotor element 32, according to one embodiment of the present invention, where the permanent magnets 44 and 46 have been removed and instead integrated into the stator. Rotor element 32 may be comprised of unitary construction and formed into a single piece. The rotor element 32 can include a series of fin structure 48 which are angularly disposed about the rotor element 32 as depicted. A peripheral edge of the fin structure 48 can be formed into a series of teeth 50 which can correspond to teeth formed into a portion of the stator, as will be further described, to help facilitate each of the dual magnetic circuits.

Removal of the permanent magnets 44 and 46 decreases overall weight of the rotor element 32, and thereby, the inertia of the rotor element 32. In one embodiment, an exemplary weight of rotor element 32 is 0.36 pounds (lbs), with a corresponding inertia of 0.0006 lbf-in-sec$^2$.

Figure 3A:
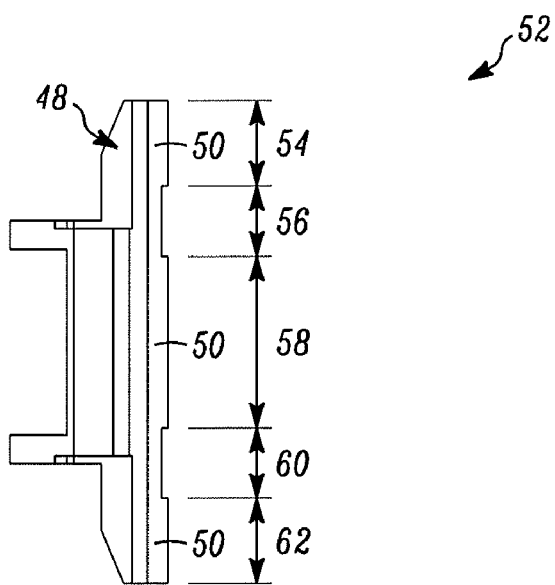
FIG. 3A illustrates a side view representation of a portion of an exemplary rotor element.

FIG. 3A illustrates a portion 52 of exemplary rotor element 32 in a side view representation. FIG. 3A again illustrates the fin structure 48 and teeth 50. A series of three teeth 50 are disposed from top to bottom as seen. Such teeth 50 may be referred to "top" teeth 50, "middle" teeth 50, and "bottom" teeth 50. In one embodiment, the top tooth 50 has a height 54 of about 0.300 inches. Additional exemplary dimensions include height 56 of about 0.250 inches, height 58 of about 0.600 inches, height 62 of about 0.250 inches, and height 62 of about 0.300 inches. Again, such exemplary dimensions may vary in other embodiments. Although the permanent magnets are integrated into the stator, at least one portion of the rotor continues to have magnetic properties (e.g. top, middle and bottom teeth 50). The term 'magnetic' may mean that that the rotor is made of a material capable of being magnetized. Such a magnetic region or plurality of regions is configured for attraction to the permanent magnets 26 and 28 integrated into the stator.

Figure 3B:
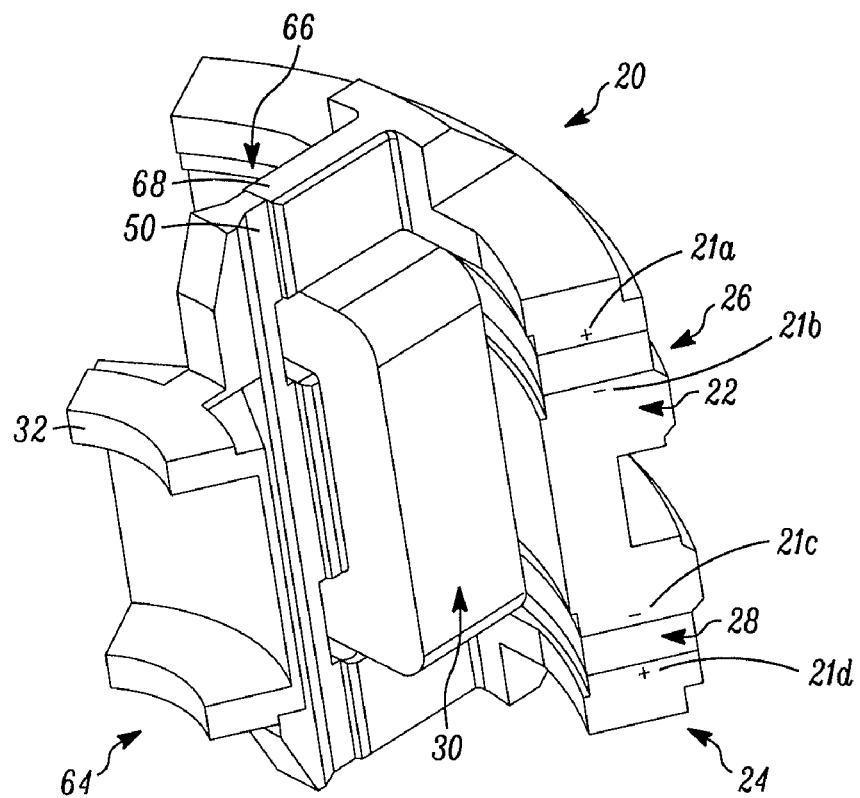
FIG. 3B illustrates a three-dimensional representation of a portion of an exemplary stator element and rotor element.

FIG. 3B illustrates a three-dimensional representation of a portion 64 of an exemplary stator element and rotor element 32. A radial air gap 66 separates the tooth 50 of the rotor element 32 from the tooth structure 68 integrated into the first outer stator portion 20. In one embodiment, the air gap 66 is about 0.004 inches in width. Center stator portion 22, as well as magnets 26 and 28, and coil 30 can again be seen. As will be appreciated, magnetic flux may travel from a respective pole of the magnet 26, through the top stator tooth 68, air gap 66, top rotor tooth 50, middle rotor tooth 50, air gap 66, middle stator tooth 68, and finally, to an opposite pole of the magnet 26 to complete one of the dual magnetic circuits. A similar path can take magnetic flux from a respective pole of permanent magnet 28 to an opposing pole of magnet 28 to complete the second of the dual magnetic circuits.

The magnetic reluctance causes the magnetic region of the rotor to be attracted to the pole respective upper or lower pole portions of the permanent magnets 26 and 28 at each end of its travel, generating a bi-stable magnetic detent at two locations. The magnetic reluctance works in combination with potential energy stored in the torsion bar 18 (FIG. 1) at each of the two stable positions of the latch 12. When the rotor element 32 is at one of the stable positions of the latch 12, the torsion bar 18 is in a twisted state. There is just enough magnetic attraction between the stator and the rotor to hold the rotor in the stable position.

The latch 12 is released by driving a current pulse through the coil 30 in a direction opposing the flux in the pole pieces of the magnets 26 and 28. The opposing flux generated by what is essentially an electromagnet counteracts the flux of the permanent magnets 26 and 28, and, if sufficiently strong, can have a repulsive effect upon the magnets, releasing them, and with the assistance of the torsion bar 18, driving the rotor toward the other latching position. The coil 30 may also be energized in the other direction to release from the opposite detent. Thus a positive pulse causes the latch to switch to one state and the opposite pulse causes it to switch to the other state.

In one embodiment, the coil 30 can be about 0.250 inches in width by about 0.375 inches in depth, while again, varying dimensions can be used. In another embodiment, two coil structures 30 can be implemented, while in other embodiments, more than two coil structures 30 can be implemented.

Figure 3C:
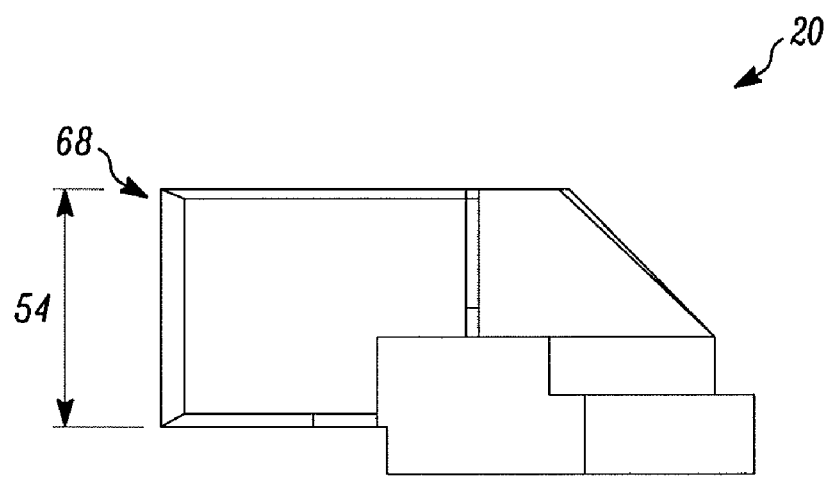
FIG. 3C illustrates a first cross-section of a portion of the exemplary stator element depicted in FIG. 3B.
Figure 3D:
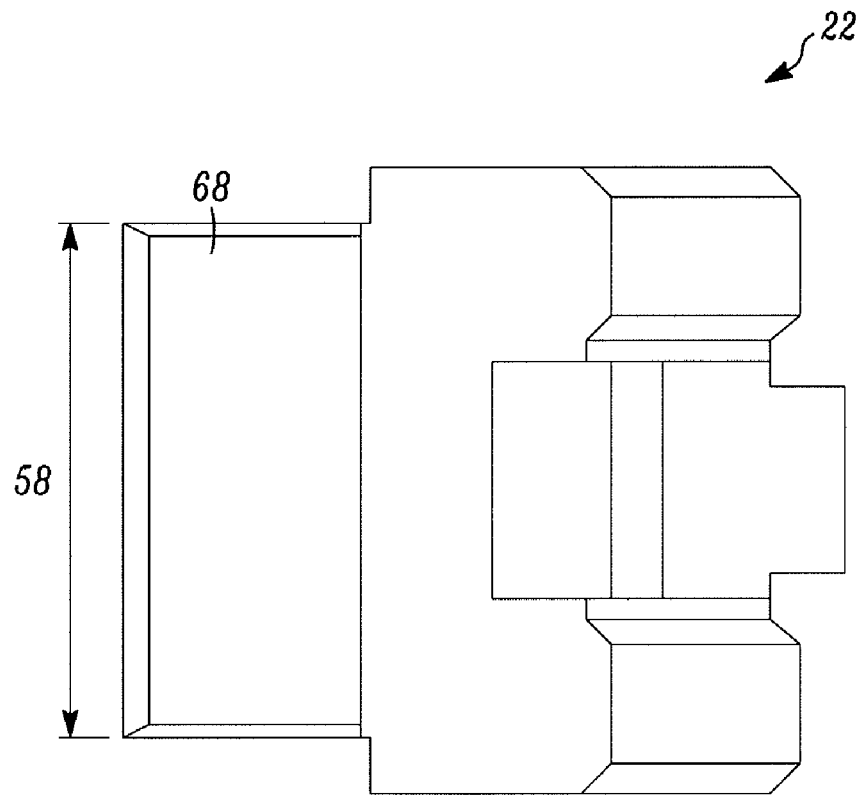
FIG. 3D illustrates a second cross-section of a portion of the exemplary stator element depicted in FIG. 3B.

FIG. 3C illustrates a cross sectional profile of a segment of outer stator portion 20. Top stator tooth structure 68 is seen, which again, may have a width 54 of about 0.300 inches. FIG. 3D illustrates a cross sectional profile of a segment of center stator portion 22. Middle stator tooth 68 is seen, which again, may have a width 58 of about 0.600 inches.

By shifting permanent magnets 26 and 28 to the stator of the latch 12 (again, FIG. 1), the mass and volume of the rotor 32 is reduced, and thereby, the power of the rotor 32 is reduced. Use of a dual magnetic circuit design increases efficiency of the respective magnetic circuits. Additionally, the magnet area may be increased without increasing the diameter of latch 12, which can increase torque. The coil volume may be increased, which reduces power consumption of the latch 12. Again, the inertia of the rotor element 32 can be reduced. In one embodiment, the reduction in rotor element 32 inertia may be reduced about 40 percent. At the same time, assembly of the latch 12 is simplified due to the requirement of fewer parts associated with the rotor 32. Rotor 32 can then be manufactured of one-piece, unitary construction, and spun-balanced to a high degree of precision, resulting in greater efficiency in operation.

All of the improvements described in the preceding paragraph lends to better performance of the latch 12, and of the overall fast pivot mechanism 10. For example, the switching time, including settling time, is decreased. The switching rate (number of switches per second) is increased. The efficiency and reliability of the mechanism 10 is increased, while the overall size of the latch 12 can be reduced, and easily tailored to different subsystem configurations. Latch 12 also consumes and dissipates less power in the process. An increased switching rate, in an embodiment such as a fast filter implementation, increases the number of allowable times per second (Hz) that an optical device such as a filter is moved into and out of a field of view (from a first latched position to a second latched position), increasing overall performance.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A bi-stable magnetic latch, comprising:
 a stator having an axis, first and second outer portions, a center portion, a first permanent magnet disposed between and abutting both the first outer portion and the center portion, and a second permanent magnet disposed between and abutting both the second outer portion and the center portion thereby forming a dual magnetic circuit including:
  a first magnetic circuit incorporating the first permanent magnet, the first outer portion of the stator, at least one magnetic region of a rotor, and the center portion of the stator, and
  a second magnetic circuit incorporating the second permanent magnet, the second outer portion of the stator, the at least one magnetic region of the rotor, and the center portion of the stator.

2. The latch of claim 1, further including a coil associated with at least one of the first and second outer portions or the center portion for overcoming a force of attraction between the magnetic region and the first and second permanent magnets when the rotor is in the first latched position.

3. The latch of claim 2, wherein the coil is energized with an electrical current of a polarity such that a flux is generated to overcome a latching flux, thereby releasing the rotor from the first latched position.

4. The latch of claim 1, further including a first tooth coupled to one of the first and second outer portions of the stator.

5. The latch of claim 4, further including a second tooth integrated into a portion of the rotor, wherein the first and second teeth are positioned on either side of a first air gap to render a portion of the first magnetic circuit.

6. The latch of claim 1, wherein the rotor is disposed within the stator.

7. The latch of claim 1, wherein the rotor is a single piece.

8. A bi-stable magnetic latch assembly, comprising:
 a stator having an axis and integrating first and second permanent magnets between and abutting first and second outer portions and each of the first and second permanent magnets separated by and abutting a single center portion, the first and second permanent magnets and the single center portion each encircling the axis;
 a rotor having first and second magnetic regions attracted to at least a portion of each of the first and second permanent magnets, whereby the first and second magnetic regions and the first and second permanent magnets constitute dual, first and second magnetic circuits; and
 a coil associated with the stator for overcoming a force of attraction between the first and second magnetic regions and the first and second permanent magnets.

9. The bi-stable magnetic latch assembly of claim 8, wherein the coil is energized with an electrical current of a polarity such that a flux is generated by magnetic elements to overcome a latching flux, thereby releasing the rotor from a first latched position.

\* \* \* \* \*